(12) United States Patent
Filliatre et al.

(10) Patent No.: US 8,339,283 B2
(45) Date of Patent: Dec. 25, 2012

(54) VIEWING DEVICE INTENDED FOR COMPREHENDING THE AERIAL ENVIRONMENT

(75) Inventors: Eric Filliatre, Merignac (FR); Philippe Neto, Eysines (FR)

(73) Assignee: Thales, Neuilly sur Seine (FR)

( * ) Notice: Subject to any disclaimer, the term of this patent is extended or adjusted under 35 U.S.C. 154(b) by 737 days.

(21) Appl. No.: 12/516,791

(22) PCT Filed: Nov. 27, 2007

(86) PCT No.: PCT/EP2007/062898
§ 371 (c)(1),
(2), (4) Date: Oct. 19, 2009

(87) PCT Pub. No.: WO2008/065120
PCT Pub. Date: Jun. 5, 2008

(65) Prior Publication Data
US 2010/0066564 A1    Mar. 18, 2010

(30) Foreign Application Priority Data
Nov. 28, 2006  (FR) ..................................... 06 10400

(51) Int. Cl.
*G08B 21/00* (2006.01)
(52) U.S. Cl. ..... 340/945; 340/905; 340/907; 340/908.1; 340/910; 340/917
(58) Field of Classification Search .................. 340/905, 340/907, 908.1, 910, 917, 934, 939; 455/414.3; 701/439, 454
See application file for complete search history.

(56) References Cited

U.S. PATENT DOCUMENTS

| 5,781,146 | A  |   | 7/1998  | Frederick |
|-----------|----|---|---------|-----------|
| 6,014,606 | A  | * | 1/2000  | Tu ................................. 701/400 |
| 6,842,122 | B1 | * | 1/2005  | Langner et al. ............... 340/945 |
| 7,486,201 | B2 | * | 2/2009  | Kelly et al. .................... 340/905 |
| 2003/0210228 | A1 | * | 11/2003 | Ebersole et al. .............. 345/157 |
| 2004/0217883 | A1 |   | 11/2004 | Judge et al. |
| 2007/0159355 | A1 | * | 7/2007  | Kelly et al. ................... 340/905 |

FOREIGN PATENT DOCUMENTS
EP  0911647 A   4/1999
FR  2535879 A1  5/1984
FR  2826762 A1  1/2003

* cited by examiner

*Primary Examiner* — Daryl Pope
(74) *Attorney, Agent, or Firm* — Stroock & Stroock & Lavan LLP

(57) ABSTRACT

Device for viewing the aerial environment for aircraft, including a display, a processor and memory configured to generate and to provide a first data processing resource, the data being a graphical representation of the aerial environment composed of colored zones, each color being associated with a danger level for the aircraft, said data comprising environmental data; and a second data processing resource for cartographic data. The device further comprises a graphical mixer to overlay the graphical representation arising from the environmental data onto a representation of the cartographic data on one viewing screen, each zone of a color of the representation of environmental data having a transparency coefficient dependent on the danger level.

11 Claims, 5 Drawing Sheets

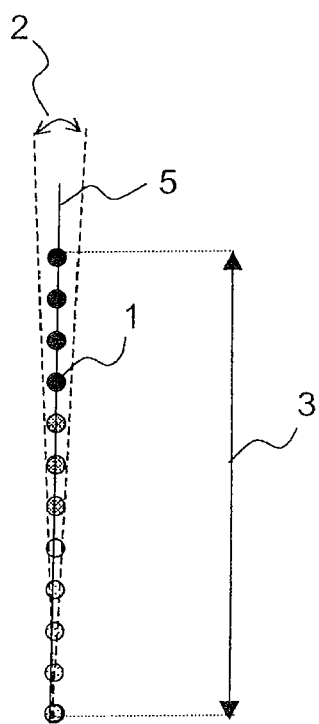
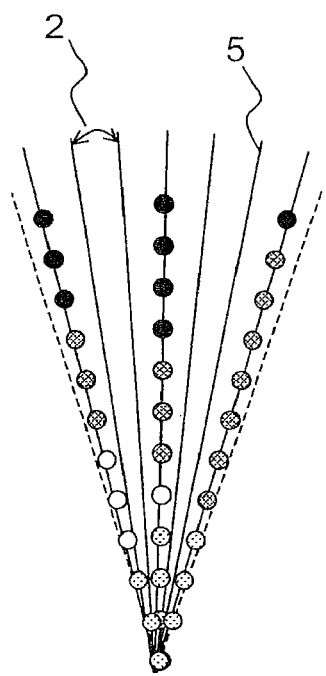
FIG.1a
FIG.1b

VIEWING DEVICE INTENDED FOR COMPREHENDING THE AERIAL ENVIRONMENT

CROSS-REFERENCE TO RELATED APPLICATION

This is a U.S. National Phase Application under 35 U.S.C. §371 of International Application no. PCT/EP2007/062898, filed Nov. 27, 2007, and claims benefit of French Patent Application No. 06 10400, filed Nov. 28, 2006, both of which are incorporated herein. The International Application was published in French on Jun. 5, 2008 as WO 2008/065120 under PCT Article 21 (2).

TECHNICAL FIELD

The present invention relates to devices for viewing graphical representations of the aerial environment. It applies, more particularly, to graphical representation systems relating to situation perception, called "Situation awareness".

BACKGROUND OF THE INVENTION

Generally, the data, arising from these representations, are correlated with cartographic data. They can be of meteorological or topological type, for example.

The device according to the invention introduces an ergonomic of various graphical representations overlaid notably by color and transparency rules which depend on the data themselves.

Currently, equipment dedicated to graphical representations of the aircraft-related environment and of the aircraft-independent environment exists in aircraft such as civil and military airplanes or helicopters.

The systems for representing the aircraft-related environment depend on data specific to the aircraft, such as the system data, the trajectory, the altimetry data or the resources of said aircraft. The pilot is constantly informed of these data. These data are paramount for navigation and are calculated and refreshed at each cycle of calculations of the avionics computer. They can, notably, serve for other applications which require information specific to the aircraft in the guise of input data to perform other calculations. These data may typically be the heading of the aircraft or its position in space, for example.

To enable the pilot to navigate with a knowledge of the environment in order to minimize the dangers, the data related to the environment of the aircraft are correlated with the environmental data independent of the aircraft. These data can be of the topological or meteorological type, for example. They can arise from a database, such as terrain data or be captured, calculated and processed in real time, such as meteorological data or terrain collision predictions.

Correlation of these data makes it possible, for example, to ascertain and to predict, for a determined heading and a known trajectory, the potential dangers related to the situation of the aircraft in its outside environment. The prediction is evaluated in the near future with the assumption that the heading and the trajectory of the aircraft remain unchanged. Viewing screens or alarms are customarily used to alert the pilot.

One of the main benefits of such functions is to evaluate potential risks, notably, of collisions, of strong turbulence or else of lightning which would cause a decline in flight safety.

Several systems exist for representing the aircraft-related environment, which each depend on the data specific to a given application.

An exemplary existing system for analyzing environmental data is the WXR system, the trade name given to the product developed and marketed by Rockwell Collins, and standing for "Weather Radar System". This equipment is used in numerous aircraft. It consists of a radar antenna, which permanently scans an angular sector situated in front of the carrier over a parametrizable distance. This equipment analyzes the atmosphere to recover meteorological data and provide them to the pilot.

On the basis of the data acquired in real time, the WXR equipment is capable of providing digitized meteorological information to the other systems of the carrier. This information then makes it possible, in the case of cockpit display systems, to depict the sector scanned on a screen and thus to display to the crew the meteorological information in relation to the position of the carrier.

Moreover, another exemplary case of such systems is the TAWS system, the acronym standing for "Terrain Awareness Warning System". The system has been developed and marketed by Thales in collaboration with L-3 Communications, under the name T2CAS.

More generally, TAWS is a system which, with respect to altimetry data, arising from a numerical database, generates a graphical display and if appropriate audible alarms on the basis of a calculation which takes into account:
  the position of the carrier, as well as various flight parameters, notably its speed and its heading;
  the extrapolations of the trajectory of the carrier in order to perform prediction calculations;
  the characteristics of the carrier in terms of performance, notably as regards the emergency climb phases at maximum performance.

On completion of this calculation, the TAWS advises the crew, graphically or in the form of audible alarms, of:
  the altitude slice in which the carrier is situated in relation to the terrain round about
  the zones of the terrain which may over a short timescale endanger the safety of the flight if the crew does not modify the trajectory of the carrier
  the zones of the terrain which endanger the safety of the flight if the crew does not immediately modify the trajectory of the carrier.

The TAWS is a function which is embedded in real-time avionics computers.

Another exemplary application is the terrain topology cartographic representation system. This system, by means of a known numerical database, constructs a graphical representation of the terrain and its attributes, such as shade, vector data and obstacles.

In particular, in aircraft, the graphical representation of the terrain is servoed for a given calculation cycle by the carrier's current position and with respect to its heading. Several modes of representing the terrain and positioning the carrier on the terrain are available depending on the operational contexts.

As regards the harmonization of the graphics, arising from the various applications, the structure of the data and the discretization of the information depends notably on each application and the protocols used. For example the TAWS and WXR applications structure their digital data according to radials.

Moreover, the cartographic function uses another mode of data structure.

Within this framework, FIG. 1a represents the digitization of information collected, in space or from a database, in the form of radials. A radial 5 is oriented along an angle close to the heading of the aircraft. In the TAWS application, the radial possesses a range 3 corresponding to the most distant point in the digitized zone. This radial comprises a certain number of points 1. Each of the points digitizes an item of information, notably calculated on the basis of the altitude of the measured point. The point represents notably a danger for the aircraft in the near future if the heading does not change. The point belongs to a zone which possesses a color code which indicates to the pilot the potential danger in the direction of the radial. The radials possess a spread, represented by an angle 2. At a given distance from the aircraft, the point discretizes the danger in a perimeter included in the angle 2 and between the point downstream and the point upstream of the point considered.

The TAWS application refreshes a set of radials in a determined calculation time and presents them to the pilot in graphical form. FIG. 1b represents a set of radials digitizing a part of space forming an angular sector, situated in front of the aircraft.

FIG. 2 represents a graphic of an example of the TAWS application. It represents an angular sector 22 digitized by points of each radial. Each point represented comprises a color information cue relating to danger, said danger being estimated on the basis of the aircraft's altitude extrapolated into the near future. This angular sector therefore comprises zones of various hues or colors. This zone covers a wide angle centered on the heading of the aircraft 23. Certain hues 20 represent a danger if the aircraft steers towards this zone, other hues 21 signify that no danger of collision is visible in this direction.

FIG. 3 represents a mapping 30 of the relief that the aircraft is overflying. The zone 31 represents a relief which could be a mountain or a hill, the zone 32 represents a space of low relief.

A drawback of the solutions such as developed, are their relative independence and their exclusive use which makes it necessary for example to integrate as many viewing screens as applications into the flight cabin. For example, each of the aforementioned three applications, the mapping application, the meteorological application, and the altimetry application, possesses dedicated graphical resources and a dedicated display.

The exclusivity of the applications requires the pilot either to manually change graphical representation on one and the same screen according to the application, or to track various screens during the piloting phase.

In the case of an overlaying of graphical representations, a major drawback amounts to choosing the representation which is displayed by priority to the pilot. In the case of an overlaying of data arising from different applications, the problem of the possible masking of certain data by a graphic can constitute a significant drawback.

These aforementioned drawbacks become yet more crucial when it is necessary to recognize danger zones for the aircraft. The danger rating of a geographical zone evolves continually during a flight performed by an aircraft. The representation of the zones of risk or danger of a given application is not differentiated in the priorities of display of the graphical representations which are overlaid.

SUMMARY OF THE INVENTION

One of the objectives of the device according to the invention is to provide the pilot with greater aid in assessing the aerial environment. The integration of the graphical data, notably of the aforementioned examples, having common components constitutes a decision aid for the pilot.

The device according to one or more embodiments of the invention lies within the framework of the integration and overlaying of the data arising from the various applications. In particular, it involves integrating the concept of danger zone and graduating the latter by colors and a transparency law. The objective is to represent on the screen an overlay integrating continually evolving zones of priority of display, of one of the graphics, that are appropriate and practical for the pilot.

An operating advantage for the pilot is of being afforded a common display of the various applications when the latter exhibit topological or geographical similarities. For example, the representation of the TAWS data and the representation of the cartographic function can be overlaid. This solution offers the pilot visual comfort and greater help with decision making in the case of imminent danger. Likewise, the WXR meteorological application can also be overlaid on the cartographic function, as well as any other applications intended to represent graphical data on a display.

Within the framework of a common representation of the various graphical representations, it is necessary to represent the information arising from different applications without impairing or masking part of the significant information of one of the applications.

Advantageously, the device for viewing the aerial environment for aircraft includes viewing means, an avionics computer, means for generating images and calculation means including:
  a first data processing resource, the data being a graphical representation of the aerial environment composed of colored zones, each color being associated with a danger level for the aircraft, said data being called environmental data;
  a second data processing resource, said data being called cartographic data.

The device includes a graphical mixer allowing the graphical representation arising from the environmental data to be overlaid on the representation of the cartographic data on one and the same viewing screen, each zone of one and the same color of the representation of environmental data having a transparency coefficient dependent on the danger level.

Advantageously, the cartographic data represent digital terrain data.

Advantageously, the environmental data digitize an angular sector ($\theta_0$) on either side of the heading of an aircraft, said angular sector having a constant range (L) and origin point defined by the current position of the aircraft or a reference position from which the calculation arises.

Advantageously, the environmental data can digitize an angular sector ($\theta_0$) on either side of the heading of an aircraft, said angular sector having a constant range (L) and an origin point defined by a reference point.

Advantageously, the environmental data are ground collision prediction data, such as for example the data originating from the TAWS system, standing for Terrain Awareness Warning System.

Advantageously, the danger zones are discretized as a function of the risks of collision.

Advantageously, the environmental data are meteorological data, such as for example the data originating from the WXR system, standing for Weather Radar System.

Advantageously, the danger zones are discretized as a function of cataloged meteorological events.

Advantageously, the transparency law assigns total transparency to the level of the danger-free zones, and therefore is not represented by the viewing means.

Advantageously, the transparency law assigns an opacity adapted to the level of the danger.

BRIEF DESCRIPTION OF THE DRAWINGS

Other characteristics and advantages of the invention will become apparent with the aid of the description which follows given in conjunction with the appended drawings which represent:

FIGS. 1a and 1b: The discretization of the data as radials;

DETAILED DESCRIPTION OF THE INVENTION

Figure 2:
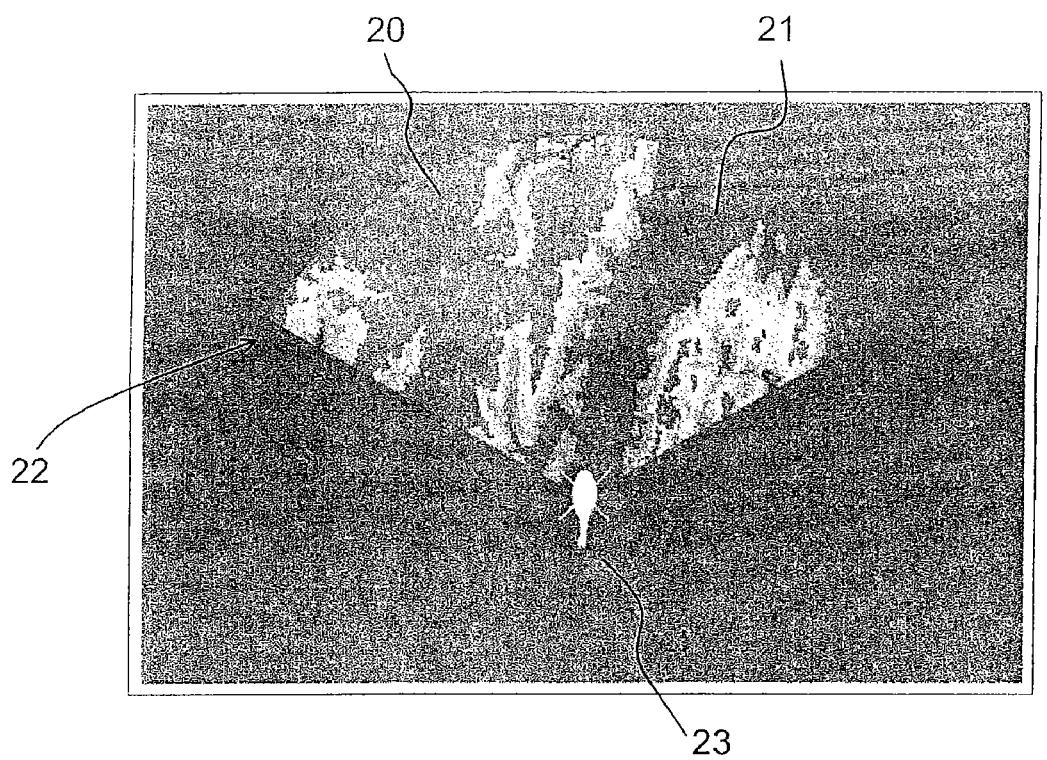
FIG. 2: The graphical representation of the data of a ground collision prediction application.
Figure 3:
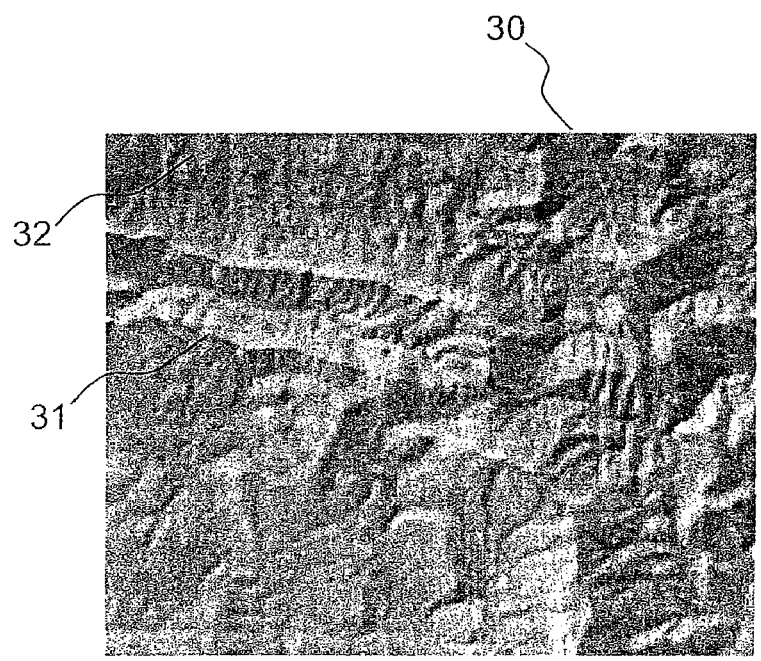
FIG. 3: The representation of the data of the mapping application.

The object of the invention includes effecting various modes of graphical combinations between various types of data provided by applications, for example TAWS or WXR applications and of the cartographic function.

It involves implementing mixing laws which make it possible, independently of the mode of graphical combination, to retain the perception of the colors arising from the various applications, such as the TAWS or WXR. This combination makes it possible not to spoil the interpretation of the information presented and thus to preserve the integrity of the data.

An exemplary embodiment is the overlaying, on one and the same viewing screen, of the data of the TAWS application and of the data arising from the cartographic function.

The reasoning is equally valid in the case of a WXR or any other application having an identical radial-type graphical data representation.

To overlay the TAWS data on the cartographic data, the various modes of graphical combinations preserve the visibility of the data produced by the TAWS. The data of the TAWS application can be integrated with the terrain data in various ways.

Firstly it is necessary to consider the colors of the danger zones arising from the data of the TAWS application. They are displayed according to the danger with the application of a transparency coefficient relating to the danger too. For example, a red color can correspond to the most dangerous zones, and a black color to the least dangerous zones. The colors of the intermediate danger zones are graduated from a red color to a green color. The hues of these colors can give an indication of danger too, for example a light color and a dark color.

The danger zones, in the case of the TAWS application, can be defined by the altitude of the aircraft, said altitude being extrapolated and compared with the topology of the terrain. The color in this case represents extrapolated altitude slices.

The zones of greatest danger represent cases of possible collisions of the aircraft with the relief, such as a mountain for example.

For example, a total opacity rule applied to the most dangerous zones of the graphic representing the data of the TAWS application gives priority to the graphical representation of these data on the colored background which represents the terrain.

The color of a pixel, denoted C, said pixel being represented on a viewing screen, arises from the mixing of the color, denoted C1, of the point considered arising from the cartographic data and of the color, denoted C2, of this same point arising from the data of the TAWS application.

An exemplary transparency law can be $C=(1-\alpha) \cdot C2 + \alpha \cdot C1$, $\alpha$ being the transparency coefficient, such that $\alpha$ varies from 0 to 1. The value 0 corresponding to no transparency of the graphic representing the data of the TAWS application, and the value 1 corresponding to complete transparency of this same graphic.

A first mode of combination includes overlaying the two graphics while applying total transparency to the data corresponding to the least dangerous zones, and total opacity for the data corresponding to the zones of risk. The least dangerous zone corresponds, generally, to plains or valleys. There is then, a priori, no risk of the aircraft colliding with the terrain.

It is then beneficial not to represent the least dangerous data on the screen while applying a total transparency coefficient to these zones. The pilot can assess the cartographic representation, notably the reliefs, shade and obstacles which then appear on the screen, at the level of the least dangerous zones.

A second mode of combination includes overlaying the two graphics while applying a transparency law covering all the danger levels. Thus, the color makes it possible to pinpoint the danger level of the TAWS data and a transparency coefficient applied to a danger level is applied to each zone. This representation allows the pilot to assess, by transparency, the cartographic representation situated under the graphical representation of the TAWS data.

An example can be represented by five colors representing different levels of danger including hues, such as the deep red, dark red, light green, dark green and black. These zones correspond respectively, for example, to danger levels such as: "risk of collision at 10 s", "risk of collision at 30 s", "close danger", "neutral", "no risk".

If three transparency coefficients are considered by way of illustration, denoted $\alpha_1$, $\alpha_2$, $\alpha_3$, applied in such a way that:

$\alpha_1$ is equal to 0 and corresponds to the zones presenting the greatest danger. The color deep red of the data of the TAWS application is predominant $\alpha_2$ is equal to 0.5 and corresponds to the zones presenting a mean danger. The colors dark red, light green and dark green are semi-transparent.

$\alpha_3$ is equal to 1, and corresponds to the zones presenting the lowest danger. The color black is rendered transparent and no longer appears.

Figure 4A:
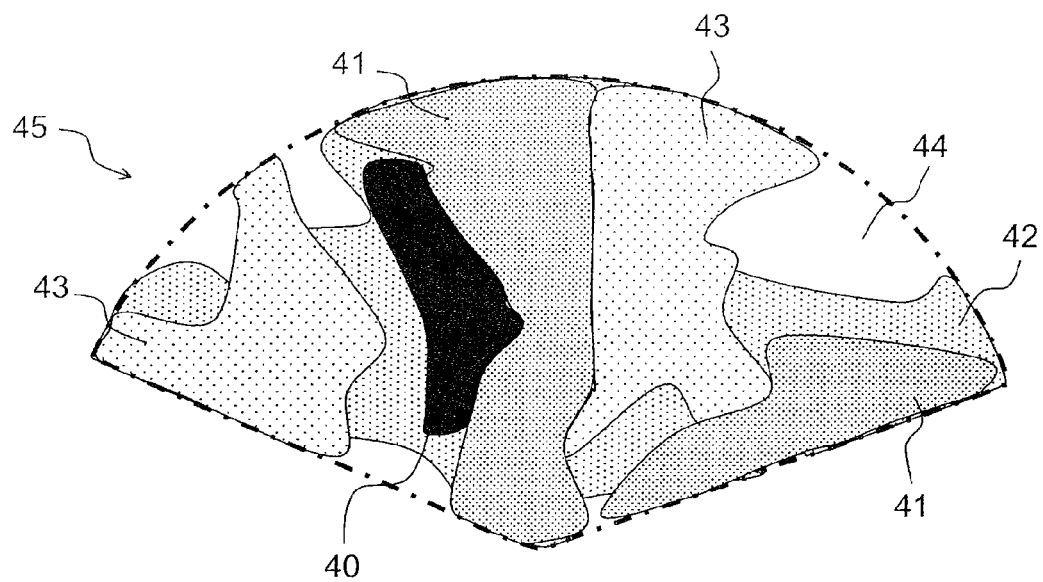
FIG. 4a: The representation of the zones of various colors associated with the various dangers of the environment.

FIG. 4a represents the zones of various dangers arising from data in an angular sector 45. This angular sector is overlaid, within the framework of the device according to one or more embodiments of the invention, on the cartographic data.

The various zones represented dotted in the figure represent, for a given concentration of dots, a zone of like danger. The density of the dots represents a color. There are 5 different colors in the figure.

Thus the zone 40 corresponds to a deep red color, it represents the most dangerous zone. The zones 41 are less dangerous, for the aircraft, than the zone 40. The color as defined previously, can be chosen to be dark red. The zones 42 present a lower danger than the zones 41. The color representing this danger can for example be light green. The zones 43 present a lower danger than the zones 42. Their color can be dark green. And finally the zones 44, represented dot-free, represent a risk-free zone. The color of these zones can for example be black.

Figure 4B:
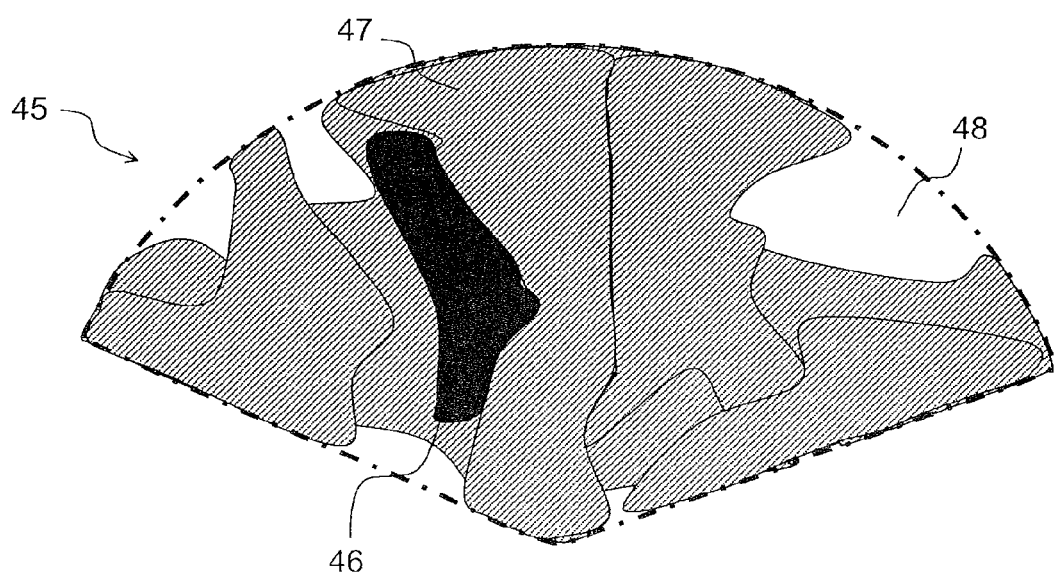
FIG. 4b: The representation of the various zones and their transparency when they are displayed on a viewing screen.

FIG. 4b represents the zones displayed with the transparency law defined as previously.

Thus the zone 46, corresponding to the highest danger is rendered opaque. The zones 47 corresponding to intermediate dangers are rendered semi-transparent. And finally, the zones 48 corresponding to the lowest danger are rendered totally transparent. In the latter case the black color disappears on the display.

Figure 5:
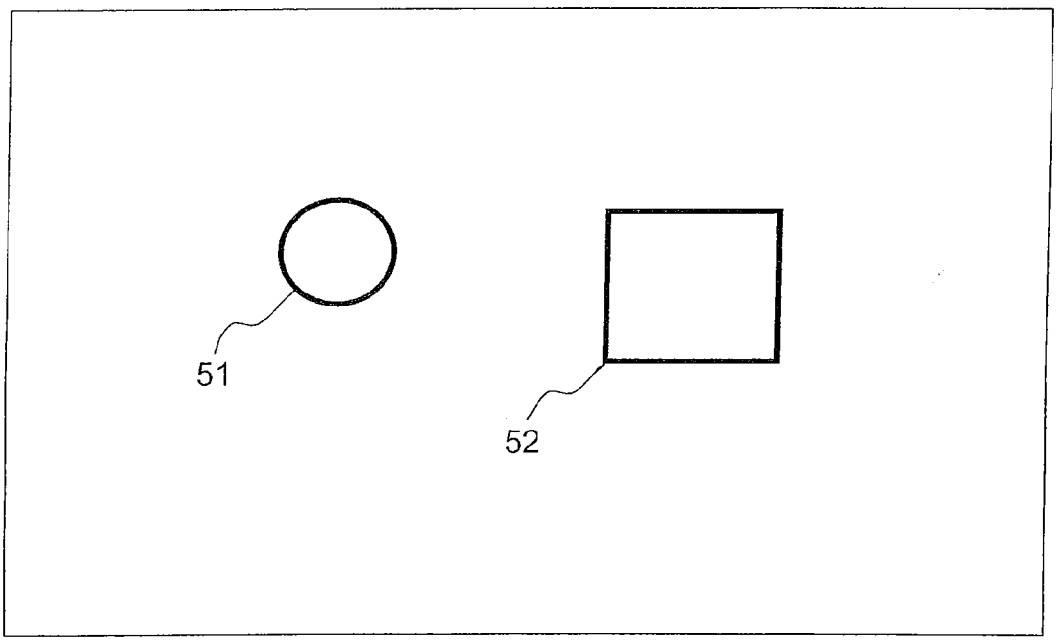
FIG. 5: The representation of the simplified cartographic data with elementary geometric shapes.

FIG. 5 represents a graphical representation of the cartographic data. This representation is simplified to elementary geometric shapes so as to obtain better readability.

The framework 50 displayed including the cartographic data includes a red circle 51 and a chestnut rectangle 52. The representation of the colors is not necessary.

Figure 6:
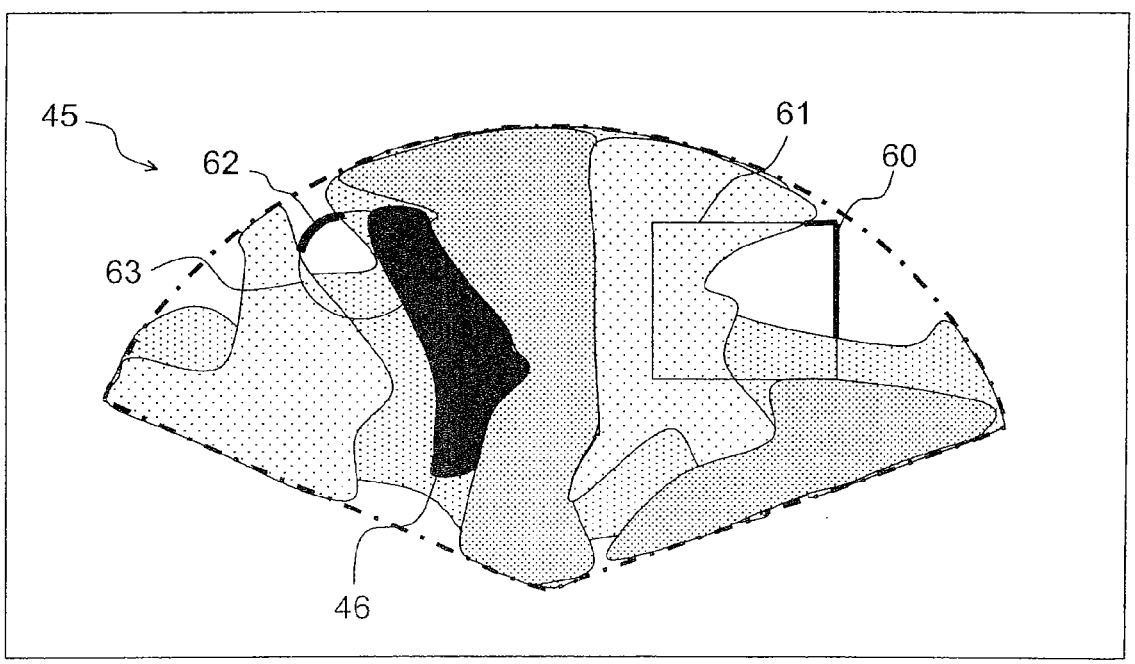
FIG. 6: The representation of the overlaying of the data arising from the ground collision prediction application and cartographic data.

FIG. 6 is the graphical representation of the environmental data, for example that of the TAWS application, overlaid on the cartographic data on one and the same viewing screen.

The circle is composed:
of a circular arc masked by the data of the TAWS application of the zone 46, said zone being rendered opaque,
of an entirely visible circular arc 62, the zone 48, FIG. 4b, being rendered transparent, and finally
of an arc 63 visible by semi-transparency by overlaying the data of the zones 47.

The rectangle is composed:
of an entirely visible part 60. the zone 48, FIG. 4b, being rendered transparent,
of a part 61 visible by semi-transparency by overlaying the data of the zones 47.

The pilot distinguishes rapidly, in this case, a dangerous zone, such as the zone 46, which is highlighted by complete overlaying of a red color rendered opaque on the terrain data.

Concerning the zone covering a danger-free space, the pilot can assess the topology of the terrain by total transparency. Moreover, the intermediate danger zones have the advantage of representing the terrain data and the environmental data by semi-transparency.

In another exemplary case, the transparency law can be progressive. Using the same notation as previously, $\alpha_1$ is equal to 0, $\alpha_2$ is equal to 0.25, $\alpha_3$ is equal to 0.50, $\alpha_4$ is equal to 0.75 and $\alpha_5$ is equal to 1.

This transparency law favors in a linear manner the representation of the environmental data as a function of the danger which arises to the aircraft.

It is possible to apply a combination of colors in such a way that the whole of the representation of the data is opaque and covers the cartographic data.

Figure 7:
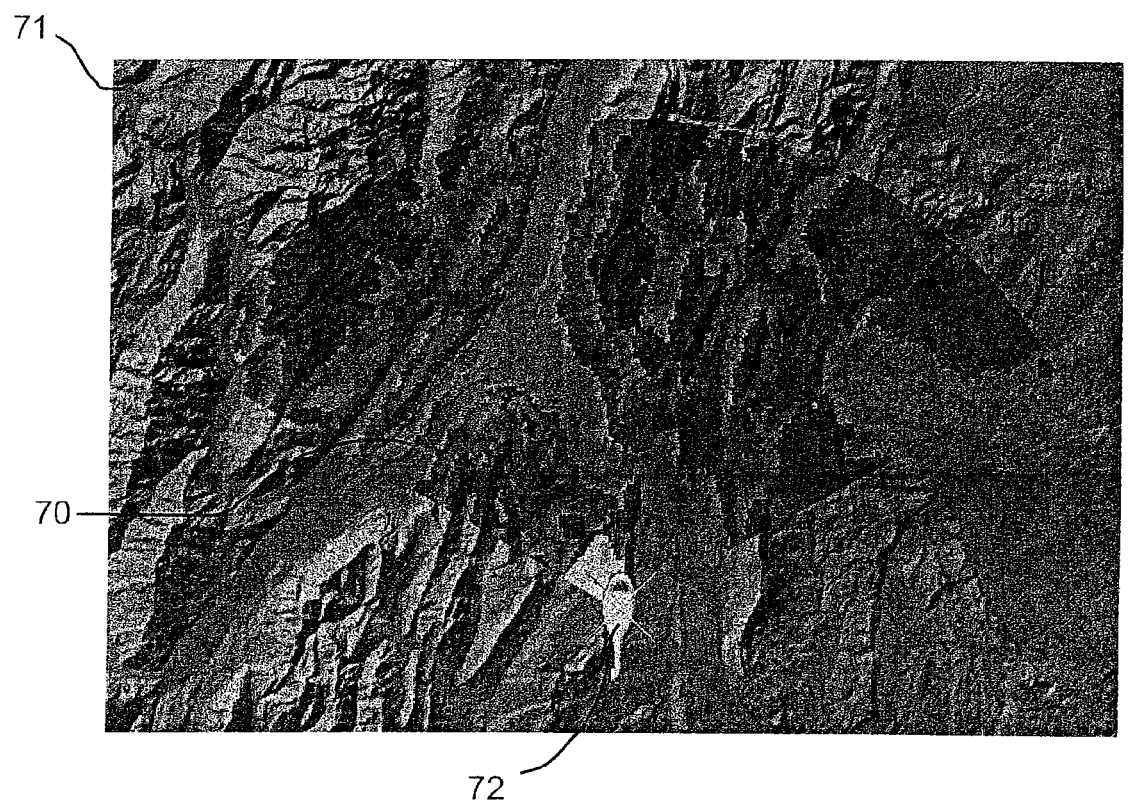
FIG. 7: The overlaying of data of the mapping and ground collision prediction applications.

FIG. 7 represents the data 70 of the TAWS application representing an angular sector situated in front of the aircraft 72. These data are overlaid with the cartographic data 71. The relief represented by the cartographic data can be discerned under the TAWS data.

In the calculations, here the reference of the angular sector is the aircraft, but this point could have been any point in space, taken as calculation reference. For example, it is possible to make predictions by extrapolating the position of the aircraft and by considering prediction data, of the meteorological or altimetry data type for example.

In the same manner it is possible to reconstruct a journey by considering past positions of the aircraft and saved data.

Moreover, the number of types of different dangers, going from the lowest to the highest, may be more significant. The coding of this information is not limited in theory. A "fine" coding, that is to say of a large number of different types of danger, will allow the pilot to discern a gradation of colors on the screen representing different danger rating zones.

Moreover, the representation which is overlaid on the cartographic data, including transparency laws, is not necessarily related to the structure of the data themselves. The TAWS application is a detailed case of realization. The device according to one or more embodiments of the invention can equally well be applied to meteorological data of the same type as the data of the WXR application or another application.

The invention claimed is:

1. A device for viewing an aerial environment for an aircraft, comprising:
a display screen;
a processor in communication with the display screen, the processor in communication with a memory,
wherein the memory is adapted to store:
a series of instructions executed by the processor to generate images;
a series of instructions executed by the processor to process environmental data, the environmental data comprising digitized data of an aerial environment from an angular sector on either side of a heading of the aircraft, said angular sector having a constant range and an origin point coincident with a reference point, the environmental data having a graphical representation comprising colored zones, wherein each color of the colored zones is associated with a respective danger level for the aircraft; and
a series of instructions executed by the processor to process cartographic data, wherein the cartographic data comprises digital terrain data,
wherein:
the device further comprises a graphical mixer to overlay the graphical representation of the environmental data onto a representation of the cartographic data on one viewing screen, wherein each zone of having a predetermined color has a transparency coefficient dependent on the danger level.

2. The viewing device as claimed in claim 1, wherein the reference point comprises a current position of the aircraft.

3. The viewing device as claimed in claim 1, wherein the reference point comprises a reference for calculating one of the environmental data and the cartographic data.

4. The viewing device as claimed in claim 1, wherein a digital representation of the environmental data is symmetric with respect to the heading of the aircraft.

5. The device as claimed in claim 1, wherein the angular sector comprises a plurality of radials, each radial having a range and a spread, with the reference point comprising a center, wherein a spacing between two adjacent radials is determined by a second angle substantially equal to half of the spread.

6. The device as claimed in claim 1, wherein the environmental data are discretized by the danger level.

7. The device as claimed in claim 6, wherein the danger zones are discretized as a function of a risk of collision of the aircraft.

8. The device as claimed in claim 1, wherein the environmental data comprise collision prediction data.

9. The device as claimed in claim 1, wherein the environmental data comprise meteorological data.

10. The graphical device as claimed in claim 1, wherein substantially total transparency is assigned to a zone having a lowest danger level, such that the zone is not displayed by the display screen.

11. The graphical device as claimed in claim 1, wherein substantially total opacity is assigned to a zone having a highest danger level.

* * * * *